US012787138B2

(12) United States Patent
Cai

(10) Patent No.: US 12,787,138 B2
(45) Date of Patent: Nov. 3, 2026

(54) LED LIGHT STRING DRIVER, LED LIGHT STRING AND CHRISTMAS TREE WITH MUSIC PLAYING FUNCTION

(71) Applicants: Winner Industry Company Limited, Dongguan City (CN); Winners Group Industries Company Limited, Guigang City (CN)

(72) Inventor: Junhao Cai, Dongguan (CN)

(73) Assignees: Winner Industry Company Limited, Dongguan City (CN); Winners Group Industries Company Limited, Guigang City (CN)

( * ) Notice: Subject to any disclaimer, the term of this patent is extended or adjusted under 35 U.S.C. 154(b) by 17 days.

(21) Appl. No.: 19/015,177

(22) Filed: Jan. 9, 2025

(65) Prior Publication Data

US 2026/0095992 A1 Apr. 2, 2026

(30) Foreign Application Priority Data

Sep. 27, 2024 (CN) ......................... 202422375315.6

(51) Int. Cl.
*H05B 47/105* (2020.01)
*F21S 4/10* (2016.01)
(Continued)

(52) U.S. Cl.
CPC .............. *H05B 47/105* (2020.01); *F21S 4/10* (2016.01); *F21V 23/008* (2013.01); (Continued)

(58) Field of Classification Search
CPC .. H05B 47/105; H05B 45/325; H05B 47/155; H05B 47/19; F21S 4/10; F21V 23/008;
(Continued)

(56) References Cited

U.S. PATENT DOCUMENTS 7,973,486 B2 * 7/2011 Neuman ................ A47G 33/06
315/185 S
8,100,550 B2 * 1/2012 Harris ....................... F21S 8/00
362/249.05
(Continued)

FOREIGN PATENT DOCUMENTS

CN 107660034 A * 2/2018 ........... G10L 15/063
CN 207678034 U 7/2018
(Continued)

*Primary Examiner* — Adam D Houston
(74) *Attorney, Agent, or Firm* — MUNCY, GEISSLER, OLDS & LOWE, P.C.

(57) ABSTRACT

The present application discloses a LED light string driver, a LED light string and a Christmas tree with music playing function. The driver includes a housing, a control board provided in the housing and a speaker; wherein, a power supply terminal of the control board is connected to an external DC power supply, a first output terminal of the control board is connected to a light string body provided externally, a second output terminal of the control board is connected to the speaker; a circuit is provided on the control board; the circuit includes: a master control chip, a LED driving module and a power amplification module electrically connected to the master control chip.

14 Claims, 3 Drawing Sheets

(51) Int. Cl.

| | |
|---|---|
| ***F21V 23/00*** | (2015.01) |
| ***F21V 23/02*** | (2006.01) |
| ***F21V 23/04*** | (2006.01) |
| ***F21V 23/06*** | (2006.01) |
| ***F21V 33/00*** | (2006.01) |
| ***H05B 45/325*** | (2020.01) |
| ***H05B 47/155*** | (2020.01) |
| ***H05B 47/19*** | (2020.01) |
| *F21Y 115/10* | (2016.01) |

(52) U.S. Cl.
CPC ........ *F21V 23/023* (2013.01); *F21V 23/0435* (2013.01); *F21V 23/06* (2013.01); *F21V 33/0056* (2013.01); *H05B 45/325* (2020.01); *H05B 47/155* (2020.01); *H05B 47/19* (2020.01); *F21Y 2115/10* (2016.08)

(58) Field of Classification Search
CPC .... F21V 23/023; F21V 23/0435; F21V 23/06; F21V 33/0056; F21Y 2115/10
See application file for complete search history.

(56) References Cited

U.S. PATENT DOCUMENTS

| | | | | |
|---|---|---|---|---|
| 8,581,513 | B1 * | 11/2013 | Reinoso ............... | H05B 47/184 315/307 |
| 2006/0137510 | A1 | 6/2006 | Cui et al. | |
| 2014/0091719 | A1 * | 4/2014 | Tsai ....................... | H05B 47/19 315/185 S |
| 2015/0343321 | A1 * | 12/2015 | Liu ........................ | A63H 33/26 446/484 |
| 2016/0007430 | A1 * | 1/2016 | Kidakarn .................. | F21S 4/10 315/185 S |
| 2020/0296505 | A1 | 9/2020 | Fang et al. | |

FOREIGN PATENT DOCUMENTS

| | | | | | |
|---|---|---|---|---|---|
| CN | 111773692 | A * | 10/2020 | ............... | G06F 8/34 |
| CN | 223076890 | U * | 7/2025 | ............. | H05B 45/20 |
| WO | WO-2007053645 | A2 * | 5/2007 | .............. | F21V 29/70 |

* cited by examiner

LED LIGHT STRING DRIVER, LED LIGHT STRING AND CHRISTMAS TREE WITH MUSIC PLAYING FUNCTION

CROSS-REFERENCE TO RELATED APPLICATION

This application claims priority to Chinese Patent Application No. CN202422375315.6 filed on Sep. 27, 2024, the entire content of which is hereby incorporated by reference.

FIELD OF TECHNOLOGY

The present application relates to the technical field of LED lights, and in particular to a LED light string driver, a LED light string and a Christmas tree with music playing function.

BACKGROUND

Decorating a house or yard with a Christmas tree during Christmas is a traditional custom in many western countries. In modern urban families, people usually use an artificial Christmas tree product as a Christmas tree, instead of a traditional natural tree. There is an artificial Christmas tree product equipped with LED light string on the market. When in use, the LED light string is wrapped on the Christmas tree and electrically illuminated to have an effect of decorating the Christmas tree.

In some existing LED light string products, the LED light string is connected to a power supply through a driver; the driver may control the LED light string to achieve a richer lighting effect. However, the driver of the existing LED light string of the Christmas tree is usually connected to the light string body and the power supply in one piece. When a user decorates the Christmas tree, the LED light string connected to the driver needed to be wrapped around a Christmas tree body. However, a weight of the driver is relatively heavy and it is not convenient for the user to wrap the LED light string, leading to a poor installation experience. Also, the driver of the existing LED light string of the Christmas tree does not have music playing function, leading to a poor rendering effect of festival atmosphere.

SUMMARY

According to a first aspect of this disclosure, a LED light string driver with music playing function is disclosed and includes: a housing, a control board provided in the housing and a speaker; wherein, a power supply terminal of the control board is connected to an external DC power supply, a first output terminal of the control board is connected to a light string body provided externally, a second output terminal of the control board is connected to the speaker;

a circuit is provided on the control board; the circuit includes: a master control chip, a LED driving module and a power amplification module electrically connected to the master control chip; the master control chip generates a PWM signal and/or a music modulated signal; the LED driving module is electrically connected to the light string body provided externally and drives the light string body to light up according to the PWM signal; the power amplification module is electrically connected to the speaker and drives the speaker to play music according to the music modulated signal;

wherein, the master control chip generates the music modulated signal according to music data;

a music data analysis module is provided in the master control chip, the music data analysis module is configured to obtain an attribute of the music data, then generate a corresponding PWM signal according to the attribute of the music data, so that an effect of a light emitted by the light string body is matched with the attribute of the music data.

According to a second aspect of this disclosure, a LED light string is disclosed and includes: a light string body and the LED light string driver with music playing function of the first aspect; wherein, an input terminal of the LED light string driver with music playing function is connected to an external DC power supply, an output terminal of the LED light string driver with music playing function is connected to the light string body to drive the light string body to light up.

According to a third aspect of this disclosure, a Christmas tree is disclosed and includes: a Christmas tree body and a LED light string wrapped on the Christmas tree body; wherein, the LED light string includes: a light string body and the LED light string driver with music playing function of the first aspect; an input terminal of the LED light string driver with music playing function is connected to an external DC power supply, an output terminal of the LED light string driver with music playing function is connected to the light string body to drive the light string body to light up.

BRIEF DESCRIPTION

DETAILED DESCRIPTION

Figure 1:
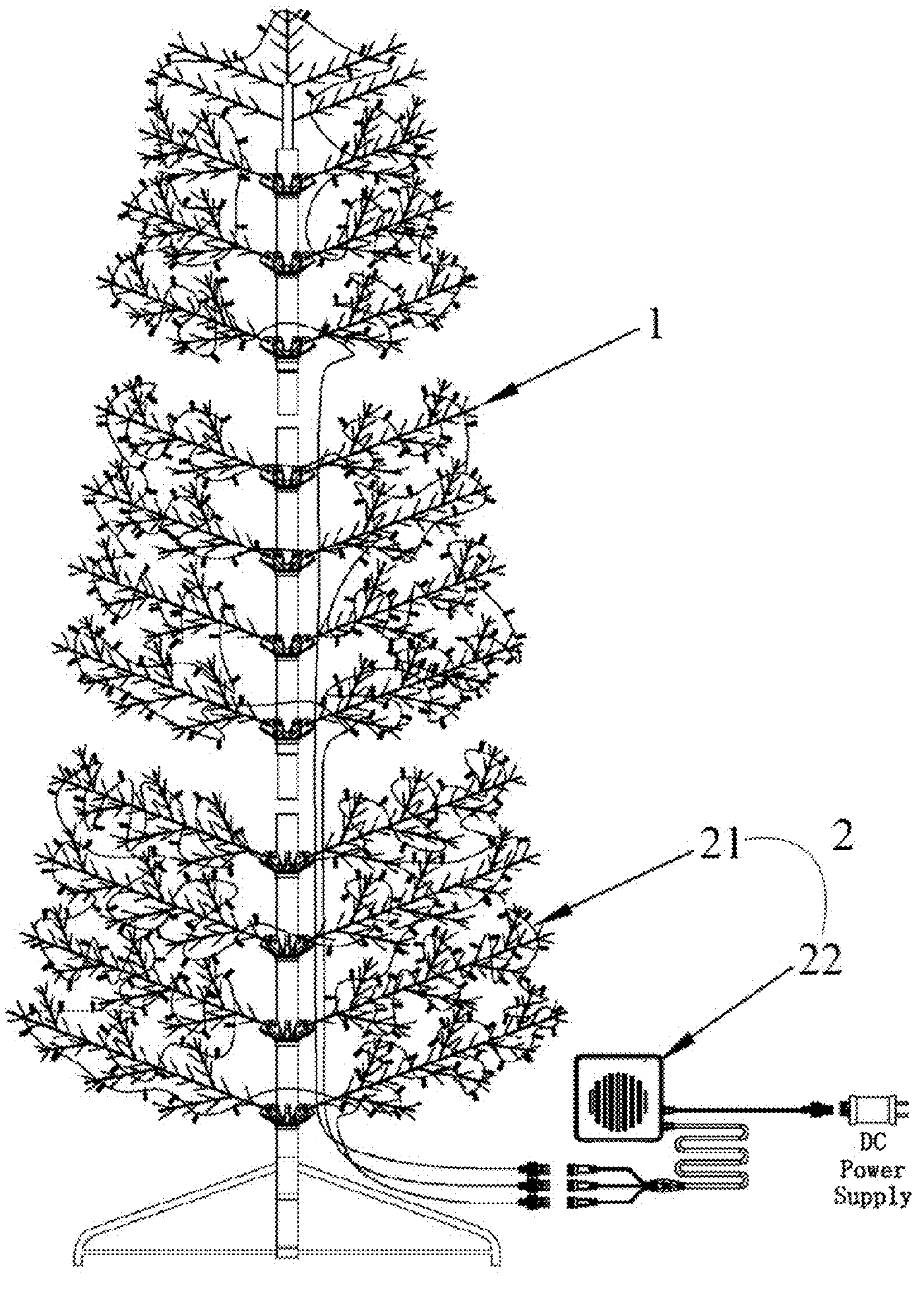
FIG. 1 is a schematic diagram of a Christmas tree of the present application.

It should be clear that the following embodiments are only some of the embodiments of the present application. All the other embodiments obtained by those skilled in the art based on the following embodiments without any creative effort shall fall within the scope of protection of the present application.

The terms used in the embodiments of the present application are merely for the purpose of describing detailed embodiments, and are not intended to limit the present application. As used in the embodiments of this application and the appended claims, the singular forms “a”, “said”, and “the” are intended to include their plural forms as well, unless the context clearly dictates otherwise. And it should also be understood that the term “and/or” as used herein refers to and includes any or all possible combinations of one or more associated listed items.

When the following description relates to the drawings, the same numbers represent the same or similar elements in the different drawings, unless otherwise indicated. The implementation modes described in the following exemplary embodiments do not represent all the implementation modes consistent with the disclosure. On the contrary, they are only the examples of the devices and methods which are detailed in the attached claims and consistent with some aspects of the disclosure. It should be noted that the terms such as "first", "second", "third" and the like in the description of the present application are only used to distinguish similar objects, but not intended to describe a specific order or sequence and cannot be construed as indicating or implying relative importance. For those ordinarily skilled in the art, the specific meaning of the forgoing terms in the present disclosure can be understood according to the specific situation.

In addition, in the description of the present disclosure, the term "a plurality of" refers to two or more unless otherwise specified. The term "and/or" is intended to describe an association between associated objects, which indicates that there may be three relationships, for example, A and/or B may indicate presence of A only, of both A and B, and of B only. The character "/" generally indicates that contextual objects have an "or" relationship.

It should be understood that the embodiments of the present application are not limited to the accurate structures which have been described above and shown in the drawings, and various modifications and changes can be made without departure from the scope of the present application. The scope of the examples of the present application is only defined by the appended claims.

Please refer to FIG. 1. FIG. 1 is a schematic diagram of a Christmas tree of the present application. The Christmas tree of the present application includes a Christmas tree body 1 and a LED light string 2 wrapped around the Christmas tree body 1. The LED light string 2 is a LED light string of the present application. The LED light string 2 includes a light string body 21 and a driver 22. An input terminal of the driver 22 is configured to be connected to an external DC power supply, and an output terminal of the driver 22 is connected to the light string body 21 through a connecting terminal to drive the light string body 21 to light up. The driver 22 is a LED light string driver with music playing function of the present application.

As it can be seen in FIG. 1, the driver 22 and the light string body 21 of the present application are separated, and the output terminal of the driver 22 is connected to an input terminal of the light string body 21 through the connecting terminal when in use. When a user arranges the Christmas tree, the light string body 21 with less weight may be wrapped around the Christmas tree body 1 firstly, and finally the light string body 21 and the driver are connected, thus improving installation experience.

Figure 2:
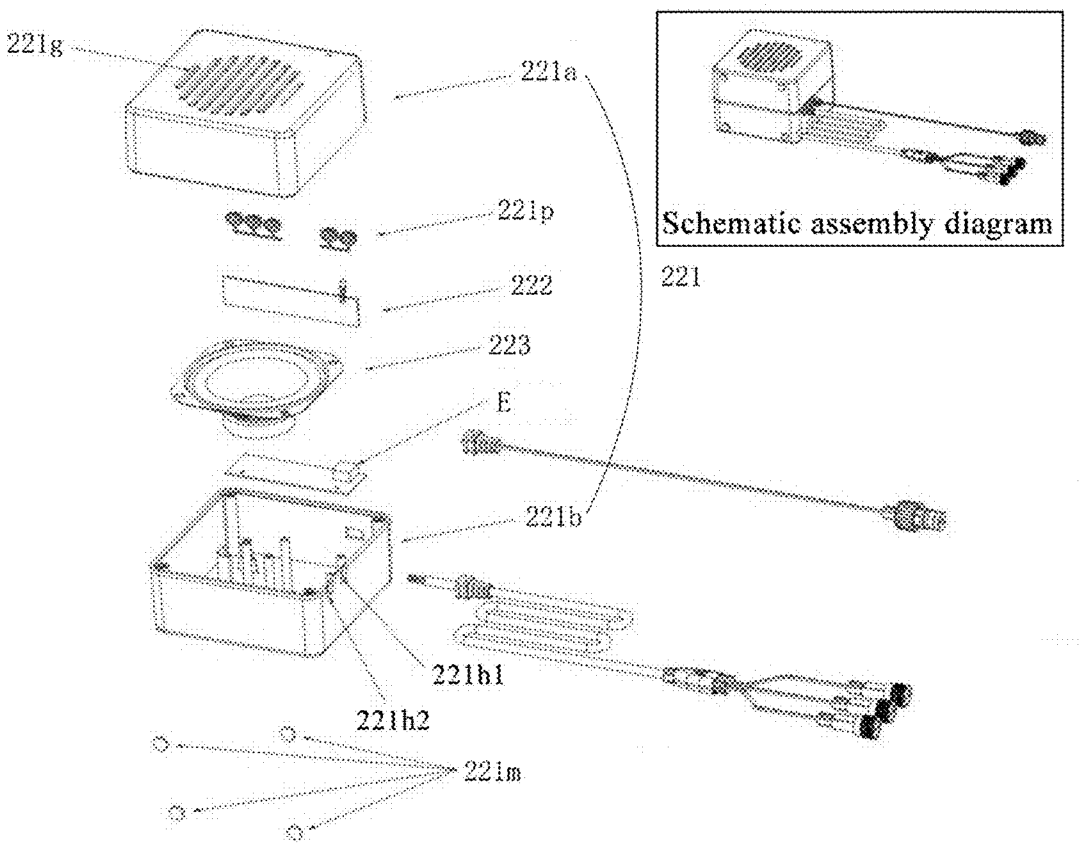
FIG. 2 is a schematic structural diagram of a LED light string driver with music playing function of the present application.

Please refer to FIG. 2. FIG. 2 is a schematic structural diagram of the LED light string driver with music playing function of the present application. The driver 22 includes: a housing 221, a key board 222, a control board E and a speaker 223. Both the key board 222, the control board E and the speaker 223 are installed in an interior of the housing 221.

A first perforation **221*h*1 and a second perforation 221*h*2 are provided on a first surface of the housing 221. A power supply terminal of the control board E is connected to the external DC power supply through the first perforation 221*h*1. An output terminal of the control board E is connected to the light string body 21 through the second perforation 221*h*2**.

A plurality of sound slots **221*g* are provided on a second surface of the housing 221. The speaker 223 is installed on one side of the interior of the housing 221 close to the plurality of the sound slots 221*g*, a sound exiting direction of the speaker 223 just face to the plurality of the sound slot 221*g*. The speaker 223** is electrically connected to the control board E and plays music according to a music modulated signal output from the control board E.

A plurality of keycaps are provided on a third surface of the housing 221. The key board 222 is installed on one side of the interior of the housing close to the plurality of the keycaps, a position of the key board 222 corresponding to each keycap the plurality of the keycaps is provided with a button. A plastic pad **221*p* is covered on the button. The key board 222 is electrically connected to the control board E. When the user press each keycap of the plurality of the keycaps on the housing 221, a corresponding button of the key board 222 is triggered, thereby enabling the key board 222** to obtain a key signal and transmit the key signal to the control board E.

A mat **221*m* is provided on a fourth surface of the housing 221. When in use, the fourth surface of the housing provided with the mat 221*m* is kept in contact with a ground or a table surface, thereby preventing the housing 221** from being worn or soiled.

In this embodiment, the housing 221 includes an upper housing **221*a* and a lower housing 221*b*. The upper housing 221*a* and the lower housing 221*b* are joined by snap-fitting, forming the housing 221** around the key board, the control board and the speaker.

Embodiment 1

Figure 3:
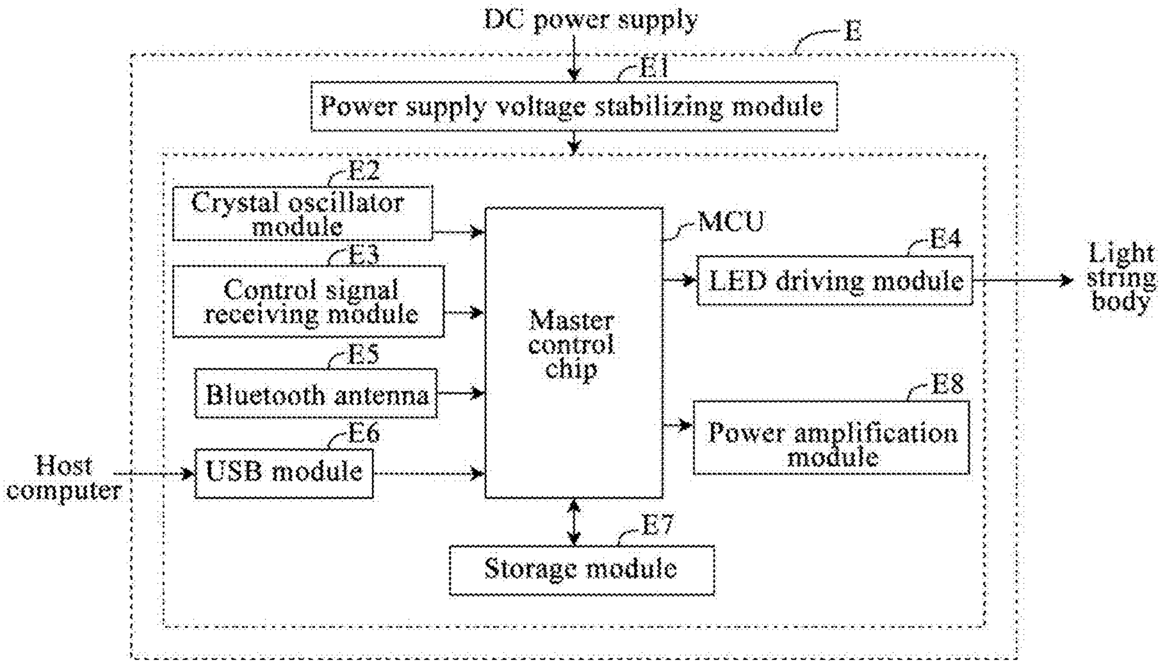
FIG. 3 is a schematic modular diagram of a circuit module of a control board of a LED light string driver with music playing function in Embodiment 1 of the present application.

Please refer to FIG. 3. FIG. 3 is a schematic modular diagram of a circuit of the control board of the LED light string driver with music playing function of Embodiment 1 of the present application. A circuit is provided on the control board E, including: a power supply voltage stabilizing module E1, a crystal oscillator module E2, a master control chip MCU, a control signal receiving module E3, a LED driving module E4, a Bluetooth antenna E5, a USB module E6, a storage module E7, and a power amplification module E8.

The power voltage stabilizing module E1 is connected to the external DC power supply and configured to convert the external DC power supply into a supply voltage required by other modules.

The crystal oscillator module E2 forms a crystal oscillator circuit to supply a clock signal required by the master control chip MCU to work.

The control signal receiving module E3 includes a key control unit and a remote control unit connected to the master control chip MCU. The key control unit is connected to the button of the key board 222. When the user triggers the button, the key control unit obtains and outputs the key signal to the master control chip MCU. The remote control unit receives a remote control signal based on a radio wave generated by a user operation on a remote controller, and outputs the remote control signal to the master control chip MCU. The master control chip MCU generates a PWM signal configured to control the LED driving module E4 according to the key signal and/or the remote control signal.

An input terminal of the LED driving module E4 is connected to an output terminal of the PWM signal of the master control chip MCU, an output terminal of the LED driving module E4 is connected to the light string body 21. The LED driving module E4 drives the light string body 21 to light up according to the PWM signal.

The Bluetooth antenna E5 is electrically connected to the master control chip MCU, and is configured to receive a Bluetooth signal sent by a host computer (e.g., mobile phone, tablet, PC). The Bluetooth signal includes both a Bluetooth control signal and music data.

One terminal of the USB module E6 is configured to be connected to the host computer, the other terminal of the USB module E6 is connected to the master control chip MCU; so that the USB module E6 transmits music data from the host computer to the master control chip MCU. The master control chip MCU processes the music data, then transmits the music data to the storage module E7 for storage. When playing music is required, the master control chip MCU obtains the music data by analyzing the Bluetooth signal or reading the storage module E7, and then generates a music modulated signal according to the music data.

One terminal of the power amplification module E8 is connected to a music modulated signal output terminal of the master control chip MCU, the other terminal of the power amplification module E8 is configured to be connected to the speaker 223. The power amplification module E8 drives the speaker 223 to play music according to the music modulated signal.

Embodiment 2

A LED light string driver with music playing function of Embodiment 2 is essentially the same as that of embodiment 1 except that: the master control chip MCU outputs three PWM signals, which are a first PWM signal PWM 1, a second PWM signal PWM 2 and a third PWM signal PWM 3. The number of LED driving modules E4 is three, which are a first LED driving module, a second LED driving module and a third LED driving module, respectively. Each LED lamp bead of the light string body 21 includes a red light emitting unit, a green light emitting unit and a blue light emitting unit.

The first PWM signal PWM1, the second PWM signal PWM2 and the third PWM signal PWM3 control the first LED driving module, the second LED driving module and the third LED driving module, respectively. The first LED driving module, the second LED driving module and the third LED driving module control the red light emitting unit, the green light emitting unit and the blue light emitting unit of the light string body 21, respectively. Therefore, the three PWM signals output by the master control chip MCU can control brightness of a red light, a green light and a blue light emitted from the red light emitting unit, the green light emitting unit and the blue light emitting unit of the light string body 21. The red light, the green light and the blue light of the LED lamp bead may synthesize lights with arbitrary colors and brightness, that is: the three PWM signals output by the master control chip MCU can control a color and brightness of the LED lamp bead of the light string body 21.

Figure 4:
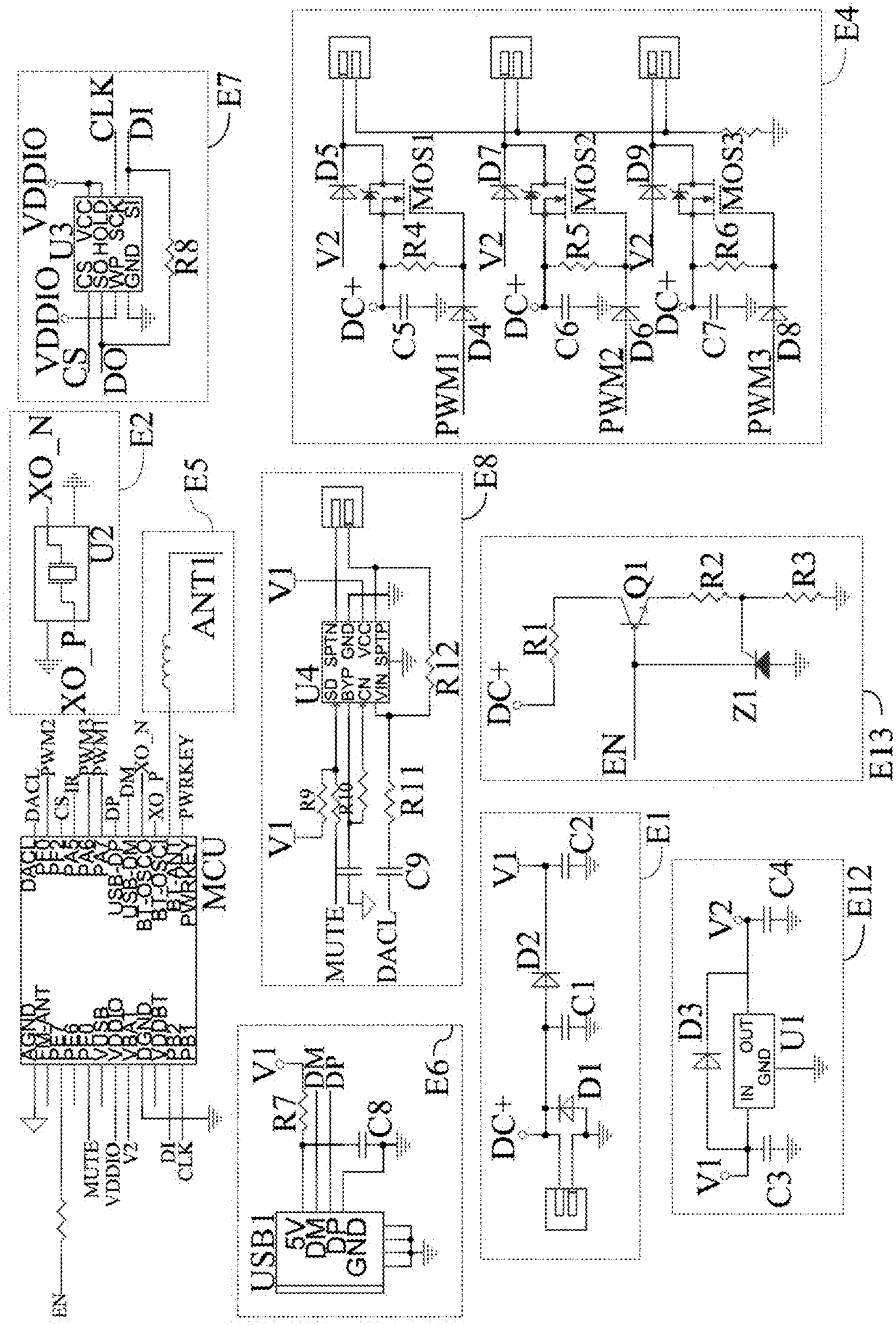
FIG. 4 is a schematic structural diagram of a circuit module of a control board of a LED light string driver with music playing function in Embodiment 2 of the present application.

Specifically, please refer to FIG. 4. FIG. 4. is a schematic structural diagram of a circuit of the control board of the LED light string driver with music playing function of Embodiment 2 of the present application.

The power supply voltage stabilizing module E1 includes a first power supply output unit E11, a second power supply output unit E12 and an enable voltage maintenance unit E13. The first power supply output unit E11 is configured to convert the external DC power supply into a first power supply V1. The first power supply V1 is configured to supply power to the power amplification module E8 and the USB module E6. The second power supply output unit is configured to convert the first power supply V1 into a second power supply V2. The second power supply V2 is configured to supply power to the LED driving module E4, the master control chip MCU and the storage module E7. The enable voltage maintenance unit E13 is configured to convert the external DC power supply into an enable voltage EN. The enable voltage EN is connected to an enable terminal of the master control chip MCU and configured to prevent the master control chip MCU from resetting.

Specifically, the first power supply output unit E11 includes: a first diode D1, a second diode D2, a first capacitor C1 and a second capacitor C2. An anode of the first diode D1 is grounded, the cathode of the first diode D1 is connected to the external DC power supply. An anode of the second diode D2 is connected to the external DC power supply, the cathode of the second diode D2 outputs the first power supply V1. One end of the first capacitor C1 is connected to the external DC power supply, the other end of the first capacitor C1 is grounded. One end of the second capacitor C2 is connected to the first power supply V1, the other end of the second capacitor C2 is grounded.

Specifically, the second power supply output unit E12 includes: a voltage regulating chip U1, a third diode D3, a third capacitor C3 and a fourth capacitor C4. An input terminal of the voltage regulating chip U1 is connected to the first power supply V1, a ground terminal of the voltage regulating chip U1 is grounded, and an output terminal of the voltage regulating chip U1 outputs the second power supply V2. An anode of the third diode D3 is connected to the first power supply V1, a cathode of the third diode D3 is connected to the second power supply V2. One end of the capacitor C3 is connected to the first power supply V1, the other end of the capacitor C3 is grounded. One end of the fourth capacitor C4 is connected to the second power supply V2, the other end of the fourth capacitor C4 is grounded.

A specific voltage value of the external DC power supply is between 3V~36V. Specific voltage values of the first power supply V1 and the second power supply V2 are set according to actual needs. In this embodiment, the external DC power supply is 6V, the first power supply V1 is 5V, the second power supply V2 is 2V.

Specifically, the enable voltage maintenance unit E13 includes: a first triode Q1, a first resistor R1, a second resistor R2, a three-pins voltage regulating tube Z1 and a third resistor R3. A base of the first triode Q1 is connected to the enable terminal EN of the master control chip MCU and is an output terminal of the enable voltage EN; a collector of the first triode Q1 is connected to the external DC power supply through the first resistor R1, an emitter of the first triode Q1 is connected to a first pin of the three-pins voltage regulating tube Z1 through the second resistor R2. A second pin (cathode) of the three-pins voltage regulating tube Z1 is connected to the base of the first triode Q1, a third pin (anode) of the three-pins voltage regulating tube Z1 is grounded. One end of the third resistor R3 is connected to the first pin of the three-pins voltage regulating tube Z1, the other end of the third resistor R3 is grounded.

The crystal oscillator module E2 includes a crystal oscillator chip U2. A first terminal XO_N and a third terminal XO_P of the crystal oscillator chip U2 are connected to two crystal oscillator connecting terminals of the master control chip MCU respectively, a second terminal and a fourth terminal of the crystal oscillator chip U2 are grounded. The crystal oscillator chip U2 and interior components in the master control chip MCU together constitute a crystal oscillator circuit to supply a clock signal for the master control chip MCU.

The control signal receiving module E3 includes a key control unit E31 and remote control unit E32 connected to the master control chip MCU. The key control unit E31 is connected to the button on the key board 222. When the user triggers the button, the key control unit E31 obtains and outputs the key signal PWRKEY to the master control chip MCU. The remote control unit E32 receives a remote control signal based on the radio wave generated by the operation of the user, and outputs the remote control signal IR to the master control chip MCU. The master control chip MCU outputs the first PWM signal PWM1, the second PWM signal PWM2 and the third PWM signal PWM3 according to the key signal PWRKEY and/or the remote control signal IR.

The first LED driving module includes a fourth diode D4, a first MOS transistor MOS1, a fourth resistor R4, a fifth capacitor C5 and a fifth diode D5. An anode of the fourth diode D4 is connected to the first PWM signal PWM1, a cathode of the fourth diode D4 is connected to a gate of the first MOS transistor MOS1. The first MOS transistor MOS1 is an NMOS transistor, the gate of the first MOS transistor MOS1 is connected to the first PWM signal PWM1 through the fourth diode D4; a source of the first MOS transistor MOS1 is connected to the external DC power supply and connected to the gate of the first MOS transistor MOS1 through the fourth resistor R4; a drain of the first MOS transistor MOS1 is a first output terminal OUT1 configured to be connected to the red light emitting unit. One end of the fifth capacitor C5 is connected to the source of the first MOS transistor MOS1, the other end of the fifth capacitor C5 is grounded. An anode of the fifth diode D5 is connected to the second power supply V2, a cathode of the fifth diode D5 is connected to the drain of the first MOS transistor MOS1.

The second LED driving module includes a sixth diode D6, a second MOS transistor MOS2, a fifth resistor R5, a sixth capacitor C6 and a seventh diode D7. An anode of the sixth diode D6 is connected to the second PWM signal PWM2, a cathode of the sixth diode D6 is connected to a gate of the second MOS transistor MOS2. The second MOS transistor MOS2 is an NMOS transistor, the gate of the second MOS transistor MOS2 is connected to the second PWM signal PWM2 through the sixth diode D6, a source of the second MOS transistor MOS2 is connected to the external DC power supply and connected to the gate of the second MOS transistor MOS2 through the fifth resistor R5, a drain of the second MOS transistor MOS2 is a second output terminal OUT2 configured to be connected to the green light emitting unit. One end of the sixth capacitor C6 is connected to the source of the second MOS transistor MOS2, the other end of the sixth capacitor C6 is grounded. An anode of the seventh diode D7 is connected to the second power supply V2, a cathode of the seventh diode D7 is connected to the drain of the first MOS transistor MOS1.

The third LED driving module includes an eighth diode D8, a third MOS transistor MOS3, a sixth resistor R6, a seventh capacitor C7 and a ninth diode D9. An anode of the eighth diode D8 is connected to the third PWM signal PWM3, a cathode of the eighth diode D8 is connected to a gate of the third MOS transistor MOS3. The third MOS transistor MOS3 is an NMOS transistor, the gate of the third MOS transistor MOS3 is connected to the third PWM signal PWM3 through the eighth diode D8, a source of the third MOS transistor MOS3 is connected to the external DC power supply and connected to the gate of the third MOS transistor MOS3 through the sixth resistor R6; a drain of the third MOS transistor MOS3 is a third output terminal OUT3 configured to be connected to the blue light emitting unit. One end of the seventh capacitor C7 is connected to the source of the third PWM signal PWM3, the other end of the seventh capacitor C7 is grounded. An anode of the ninth diode D9 is connected to the second power supply V2, a cathode of the ninth diode D9 is connected to the drain of the third MOS transistor MOS3.

The USB module E6 includes a USB chip USB1, a seventh resistor R7 and an eighth capacitor C8. A power supply terminal of the USB chip USB1 is connected to the first power supply V1 through the seventh resistor R7, a first differential output terminal DP and a second differential output terminal DM of the USB chip USB1 are connected to a first music data input terminal DP and a second music data input terminal DM of the master control chip MCU, and a ground terminal of the USB chip USB1 is grounded. The eighth capacitor C8 is connected between the power supply terminal and the ground terminal of the USB chip USB1. When in use, an input terminal of the USB chip USB1 is connected to the host computer and obtains music data transmitted from the host computer, then differentially transmits the music data to the master control chip MCU through the first differential output terminal DP and the second differential output terminal DM.

The storage module E7 includes a storage chip U3 and an eighth resistor R8. An enable terminal CS of the storage chip U3 is connected to a storage enable signal CS output by the master control chip MCU; a clock input terminal SCK of the storage chip U3 is connected to a storage clock signal CLK output by the master control chip MCU, a power supply terminal VCC and a write-protect enable terminal of the storage chip U3 are connected to a storage chip power supply voltage VDDIO output by the master control chip MCU, a serial port input terminal SI and a serial port output terminal SO of the storage chip U3 are connected to a storage signal output terminal DI and a read signal input terminal DO of the master control chip MCU, respectively. When the master control chip MCU needs to store or read the music data, an enable terminal signal CS is output to the enable terminal CS of the storage chip U3, and the storage clock signal CLK is output to the clock input terminal SCK of the storage chip U3, thereby enabling the storage chip U3 enters a working state. When the master control chip MCU needs to store the music data, the music data obtained by the USB module E6 is output to the serial port input terminal S1 of the master control chip MCU through the storage signal output terminal D1, so that the storage chip U3 stores the music data. When the master control chip MCU needs to read the music data stored in the storage chip U3, the storage chip U2 outputs the stored music data to the read signal input terminal DO of the master control chip MCU through the serial port output terminal SO.

The power amplification module E8 includes a power amplification chip U4, a ninth resistor R9, a tenth resistor R10, an eleventh resistor R11, a ninth capacitor C9 and a twelfth resistor R12. A power supply terminal VCC of the power amplification chip U4 is connected to the first power supply V1, a ground terminal GND of the power amplification chip U4 is grounded. An enable terminal SD of the power amplification chip U4 is connected to the first power supply V1 through the ninth resistor R9 with a relative larger resistance (e.g., 100*k* (2), and connected to a power amplification enable signal MUTE output by the master control chip MCU through the tenth resistor R10 with relative smaller resistance (e.g., 1*k* (2). When playing music is required, the master control chip MCU output the power amplification enable signal MUTE to the enable terminal SD of the power amplification chip U4, so that the enable terminal SD of the power amplification chip U4 is converted from a high level to a low level and the power amplification chip U4 enters a working state. An input terminal VIN of the power amplification chip U4 is connected to a music modulated signal DACL output by the master control chip through the eleventh resistor R11 and the ninth capacitor C9; a first output terminal SPTP and a second output terminal SPTN of the power amplification chip U4 are configured to be connected to two input terminals of the speaker 223, respectively, to drive the speaker 223 to play music. One end of the twelfth resistor R12 is connected to the input terminal VIN of the power amplification chip U4, the other end of the twelfth resistor R12 is connected to the first output terminal SPTP of the power amplification chip U4.

In this embodiment, a model of the master control chip MCU is AB5356A; a model of the voltage regulating chip U1 is XC6206-4.2V; a model of the three-pins voltage regulating tube Z1 is ME432; a model of the crystal oscillator chip U2 is 26 MHz/9 PF/10 PPM; a model of the storage chip U3 is EN25Q128; a model of the power amplification chip U4 is XA8002DC; a model of the USB chip USB1 is USB_AM_02; a model of the first MOS transistor MOS1, both the second MOS transistor MOS2 and the third MOS transistor MOS3 are 40P07; a model of the triode Q1 is D882. Other specific parameters of capacitors and resistors may be adjusted by the person skilled in the art and are no limited in the present application.

The LED light string driver of the present application provides two music playing methods: 1, the master control chip establishes a wireless connection to the host computer through the Bluetooth antenna, and obtain the music data transmitted by the host computer in real time, then the music data is converted into the music modulated signal DACL and transmitted to the power amplification module; the power amplification module drives the speaker to play music. 2, the master control chip obtains the music data in the host computer through the USB module in advance, and stores the music data in the storage module; when playing music is required, the master control chip reads the music data in the storage module, and the music data is converted into the music modulated signal and transmitted to the power amplification module; the power amplification module drives the speaker to play music.

Furthermore, when the master control chip MCU generates the music modulated signal DACL according to the music data, the master control chip MCU also obtains an attribute of the music data though an internal music data analysis module, then generates a corresponding PWM signal according to the attribute of the music data to control the light string body, so that an effect of a light emitted by the light string body is matched with the attribute of the music data.

In one embodiment, the attribute of the music data specifically includes a music speed. The effect of the light emitted by the light string body is matched with the attribute of the music data, including: a flicker frequency of the light emitted by the light string body is matched with the music data. A relationship between the flicker frequency of the light emitted by the light string body and the music speed is indicated by the following formula:

$$f = \begin{cases} a \cdot BPM, & BPM \le \dfrac{f_{max}}{a} \\ f_{max}, & BPM > f_{max} \end{cases}$$

wherein, f represents the flicker frequency of the light emitted by the light string body, BPM represents the music speed, a represents a preset frequency-speed relation constant, $f_{max}$ represents a preset maximum value of the flicker frequency of the light emitted by the light string body. For example, it is assumed that the music speed is 240 BPM (240 beats per minute), then the flicker frequency of the light emitted by the light string body is controlled by the master control chip MCU to flicker 240 times (a=1), 120 times (a=½), 60 times (a=¼) or 30 times (a=⅛) per minute, etc.

In another embodiment, the effect of the light emitted by the light string body is matched with the attribute of the music data, further including: a color of the light emitted by the light string body is matched with the music speed. A relationship between the color of the light emitted by the light string body and the music speed is indicated by the following formula:

$$H = \begin{cases} 0°, & BPM < BPM_{min} \\ 360° \cdot \dfrac{BPM - BPM_{min}}{BPM_{max} - BPM_{min}}, & BPM \in [BPM_{min}, BPM_{max}] \\ 360°, & BPM > BPM_{max} \end{cases}$$

wherein, H represents a hue degree of the color of the light emitted by the light string body in HSV color space, BPM represents the music speed, $BPM_{min}$ represents a preset minimum value of an effective range of the music speed, $BPM_{max}$ represents a preset maximum value of the effective range of the music speed.

The music data analysis module includes a music speed calculating unit. The music speed calculating unit is configured to calculate the music speed according to the music data and specifically executes the following steps:

S1, preprocessing the music data to obtain a preprocessed music signal.

In this embodiment, the step of S1 further includes the following steps:

S11, resampling the music data to obtain a resampled music signal.

S12, merging sound channels of the resampled music signal to obtain a mono music signal.

S13, performing volume normalization on the mono music signal to obtain a normalized music signal; a calculation formula of the volume normalization is:

$$y(n) = \frac{x(n) - x_{min}}{x_{max} - x_{min}}(D_{max} - D_{min}) + D_{min}.$$

wherein, x(n) represents an input signal, y(n) represents an output signal, $x_{max}$ represents a maximum value of the input signal, $x_{min}$ represents a minimum value of the input signal, $D_{max}$ represents a maximum value of a target normalization interval, $D_{min}$ represents a minimum value of the target normalization interval. In this embodiment, the target normalization interval is [−1,1], that is, $D_{max}$=1, $D_{min}$=−1.

S14, filtering and denoising the normalized music signal through a filter to obtain a preprocessed music signal. The filter includes but is not limited to RC filter, Gaussian filter, morphological filter, etc.

In this embodiment, the step of preprocessing includes specifically: resampling, merging sound channels, performing volume normalization and denosing. Since music data files with different specifications may have different sample rates, channels and volumes, and these attributes are independent of the music speed and will interfere a subsequent music speed calculations. Therefore, when preprocessing, the music data with different specifications are transformed into music signals with uniform sampling rate, mono and maximum volume. Finally, noise in the music signal is removed by the filter, and the preprocessed music signal is obtained.

S2, detecting beat points of the preprocessed music signal to obtain a plurality of the beat points.

In this embodiment, the step of S2 further includes the following steps:

S21, performing a short-time Fourier transform on the preprocessed music signal to obtain a spectrum of the music signal $X_n$, wherein a calculation formula of the short-time Fourier transform is:

$$X_n(e^{j\omega}) = \sum_{m=-\infty}^{\infty} x(m)\omega(n-m)e^{-j\omega m}.$$

wherein, $X_n(e^{j\omega})$ is the spectrum obtained by the short-time Fourier transform of the music signal x(n), ω(n) is a window function, n is a time scalar.

S22, performing logarithm processing on an amplitude |X| of the spectrum $X_n$ of the music signal to obtain a compressed spectrum Y; wherein a calculation formula of the compressed spectrum is: $Y=\lg(1+C\cdot|X|)$.

wherein, Y represents the compressed spectrum, |X| represents the amplitude of the spectrum of the music signal, C is a constant. In this embodiment, C=1000. An Object of calculating the compressed spectrum is to adjust a dynamic range of the music signal and enhance a weak transient sharpness, especially in a high frequency region.

S23, calculating a discrete derivative of the compressed spectrum to obtain an endpoint intensity curve; wherein a calculation formula of the endpoint intensity curve is:

$$\Delta(t) = \sum_{k=1}^{K} |Y(t+1, k) - Y(t, k)| \geq 0,\ t \in Z$$

$$|x| \geq 0 = \begin{cases} x, & x \geq 0 \\ 0, & x < 0 \end{cases}.$$

wherein, Δ(t) represents the endpoint intensity curve, Y represents the compressed spectrum.

S24, extracting peak values of the endpoint intensity curve through calculating an autocorrelation function of the end point intensity curve; point corresponding to the peak values are the beat point.

S3, counting the number of the beat points in a preset time period, and calculating the music speed according to a length T of the preset time period and the number N of the beat points. Wherein, a calculation formula of the music speed is:

$$PM = \frac{N}{T}.$$

wherein, BPM represents the music speed, T represents the length of the preset time period, N represents the number of the beat points in the preset time period.

The user may controls the LED light string driver of the present application to play music and drive the LED light string through the following three methods: 1, Operating the button provided on the housing 221 to output the key signal PWRKEY to the master control chip, so that the master control chip controls the storage module, the power amplification module and/or the LED driving module according to the key signal PWRKEY. 2, Operating the remote controller to generate remote control signal IR based on the radio wave, so that the master control chip controls the storage module, the power amplification module and/or the LED driving module according to the remote control signal IR. 3, Operating the host computer connected to the master control chip to generate the Bluetooth signal, so that the master control chip controls the storage module, the power amplification module and/or the LED driving module according to the Bluetooth signal.

The present application has the following technical effects: 1, The driver is separated from the LED light string body and only connected to the LED light string body through the connecting terminal when in use. When the user decorates the Christmas tree, the user may first wrap the relatively light LED light string body around the Christmas tree, and then connect it to the driver, thus improving the installation experience. 2, The driver has music playing function, which not only meets the users' needs to decorate Christmas trees, but also provides a pleasure of enjoying music. It enhances a holiday atmosphere and offers a more novel user experience. 3, The user may control the effect of the light emitted by the light string body and/or a music playing effect through various methods such as button, remote control or Bluetooth, which is suitable for a variety of operating scenarios and is more convenient to use. 4, The flicker frequency or color of the light emitted by the light string body is matched with the music speed, therefore greatly enhances a linkage performance between the music and the light emitting, provides a experience of use of visual and auditory harmony, and further improves a rendering effect of the holiday atmosphere.

The above-mentioned embodiments express only several implementations of the present application, and their descriptions are more specific and detailed, but they should not be construed as a limitation of the scope of the patent application. It should be noted that for a person of ordinary skill in the art, a number of variations and improvements can be made without departing from the conception of the present application, and these belong to the scope of protection of the present application.

What is claimed:

1. A LED light string driver with music playing function, comprising:

a housing, a control board provided in the housing and a speaker; wherein, a power supply terminal of the control board is connected to an external DC power supply, a first output terminal of the control board is connected to a light string body provided externally, a second output terminal of the control board is connected to the speaker;

a circuit is provided on the control board; the circuit includes: a master control chip, a LED driving module and a power amplification module electrically connected to the master control chip; the master control chip generates a PWM signal and/or a music modulated signal; the LED driving module is electrically connected to the light string body provided externally and drives the light string body to light up according to the PWM signal; the power amplification module is electrically connected to the speaker and drives the speaker to play music according to the music modulated signal;

wherein, the master control chip generates the music modulated signal according to music data;

a music data analysis module is provided in the master control chip, the music data analysis module is configured to obtain an attribute of the music data, then generate a corresponding PWM signal according to the attribute of the music data, so that an effect of a light emitted by the light string body is matched with the attribute of the music data=;

wherein, the attribute of the music data includes a music speed;

the effect of the light emitted by the light string body is matched with the attribute of the music data, specifically including: a flicker frequency of the light emitted by the light string body is matched with the music speed, or a color of the light emitted by the light string body is matched with the music speed;

wherein, the music data analysis module further includes a music speed calculating unit;

the music speed calculating unit is configured to calculate the music speed according to the music data, and the music speed calculating unit specifically is configured to perform the following steps:

S1, preprocessing the music data to obtain a preprocessed music signal;

S2, detecting beat points of the preprocessed music signal to obtain a plurality of the beat points;

S3, counting the number of the beat points in a preset time period to calculate the music speed according to a length T of the preset time period and the number N of the beat points; wherein a calculation formula of the music speed is: BPM=N/T, wherein, BPM represents the music speed, T represents the length of the preset time period, N represents the number of the beat points in the preset time period.

2. The LED light string driver with music playing function of claim 1, wherein, S2 specifically includes:

S21, performing a short-time Fourier transform on the preprocessed music signal to obtain a spectrum $X_n$ of a music signal, wherein a calculation formula of the short-time Fourier transform is:

$$X_n(e^{j\omega}) = \sum_{m=-\infty}^{\infty} x(m)\omega(n-m)e^{-j\omega m},$$

wherein, $X_n$ ($e^{j\omega}$) is the spectrum obtained by the short-time Fourier transform of the music signal x(n), ω(n) is a window function, n is a time scalar;

S22, performing logarithm processing on an amplitude |X| of the spectrum $X_n$ of the music signal to obtain a compressed spectrum Y; wherein a calculation formula of the compressed spectrum is: Y=Ig (1+C·|X|), wherein, Y represents the compressed spectrum, |X| represents the amplitude of the spectrum of the music signal, C is a constant;

S23, calculating a discrete derivative of the compressed spectrum Y to obtain an endpoint intensity curve; wherein a calculation formula of the endpoint intensity curve is:

$$\Delta(t) = \sum_{k=1}^{K} |Y(t+1, k) - Y(t, k)| \geq 0, t \in Z$$

-continued $$|x| \geq 0 = \begin{cases} x, & x \geq 0 \\ 0, & x < 0 \end{cases},$$

wherein, Δ(t) represents the endpoint intensity curve, Y represents the compressed spectrum; S24, extracting peak values of the endpoint intensity curve through calculating an autocorrelation function of the endpoint intensity curve Δ(t); wherein, points corresponding to the peak values are the beat points.

3. The LED light string driver with music playing function of claim 2, wherein, a relationship between the flicker frequency of the light emitted by the light string body and the music speed is represented by the following formula:

$$f = \begin{cases} a \cdot BPM, & BPM \leq \frac{f_{max}}{a} \\ f_{max}, & BPM > f_{max} \end{cases},$$

wherein, f represents the flicker frequency of the light emitted by the light string body, BPM represents the music speed, a represents a preset frequency-speed relation constant, $f_{max}$ represents a preset maximum value of the flicker frequency of the light emitted by the light string body.

4. The LED light string driver with music playing function of claim 3, wherein, a relationship between the color of the light emitted by the light string body and the music speed is represented by the following formula:

$$H = \begin{cases} 0°, & BPM < BPM_{min} \\ 360° \cdot \frac{BPM - BPM_{min}}{BPM_{max} - BPM_{min}}, & BPM \in [BPM_{min}, BPM_{max}] \\ 360°, & BPM > BPM_{max} \end{cases},$$

wherein, H represents a hue degree of the color of the light emitted by the light string body in a HSV color space, BPM represents the music speed, $BPM_{min}$ represents a preset minimum value of an effective range of the music speed, $BPM_{max}$ represents a preset maximum value of the effective range of the music speed.

5. The LED light string driver with music playing function of claim 1, further comprising:

a key board provided in the housing; wherein, the key board is electrically connected to the master control chip of the control board;

when a user presses a keycap provided on the housing, the key board obtains a key signal and transmits the key signal to the master control chip;

the master control chip modulates an output of the PWM signal and/or the music modulated signal according to the key signal.

6. The LED light string driver with music playing function of claim 5, wherein, the circuit further includes a USB module and a storage module;

the USB module is configured to be connected to an external host computer to obtain the music data transmitted by the external host computer and transmit the music data to the master control chip;

the master control chip processes the music data, then transmits the music data to the storage module for storage;

when playing music is required, the master control chip reads the music data in the storage module and generates the music modulated signal according to the music data.

7. The LED light string driver with music playing function of claim 6, wherein, the circuit further includes a Bluetooth antenna;

the Bluetooth antenna is electrically connected to the master control chip and configured to receive a Bluetooth signal sent by the external host computer and transmit the Bluetooth signal to the master control chip;

the Bluetooth signal includes a Bluetooth control signal and the music data;

when playing music is required, the master control chip analyzes the Bluetooth signal to obtain the music data, and generates the music modulated signal according to the music data;

the master control chip modulates the output of the PWM signal and/or the music modulated signal according to the Bluetooth control signal.

8. The LED light string driver with music playing function of claim 7, wherein, the circuit further includes a remote control unit;

the remote control unit is electrically connected to the master control chip and configured to receive a remote control signal sent by an external remote controller and transmit the remote control signal to the master control chip;

the master control chip modulates the output of the PWM signal and/or the music modulated signal according to the remote control signal.

9. The LED light string driver with music playing function of claim 8, wherein, the number of the LED driving module is three, which are a first LED driving module, a second LED driving module and a third LED driving module;

the master control chip outputs a first PWM signal, a second PWM signal and a third PWM signal to the first LED driving module, the second LED driving module and the third LED driving module, respectively;

the first LED driving module, the second LED driving module and the third LED driving module drive a red light emitting unit, a green light emitting unit and a blue light emitting unit of the light string body according to the first PWM signal, the second PWM signal and the third PWM signal, respectively;

wherein, the first LED driving module includes a fourth diode, a first MOS transistor, a fourth resistor, a fifth capacitor and a fifth diode; an anode of the fourth diode is connected to the first PWM signal, a cathode of the fourth diode is connected to a gate of the first MOS transistor; the first MOS transistor is a NMOS transistor, the gate of the first MOS transistor is connected to the first PWM signal through the fourth diode; a source of the first MOS transistor is connected to the external DC power supply and connected to the gate of the first MOS transistor through the fourth resistor; a drain of the first MOS transistor is connected to the red light emitting unit of the light string body; one end of the fifth capacitor is connected to the source of the first MOS transistor, the other end of the fifth capacitor is grounded; an anode of the fifth diode is connected to a second power supply; a cathode of the fifth diode is connected to the drain of the first MOS transistor.

10. The LED light string driver with music playing function of claim 9, wherein, the circuit further includes a power supply voltage stabilizing module;

the power supply voltage stabilizing module includes an enable voltage maintenance unit;

the enable voltage maintenance unit is configured to convert the external DC power supply into an enable voltage; the enable voltage is connected to an enable terminal of the master control chip to prevent the master control chip from resetting;

the enable voltage maintenance unit includes: a first triode, a first resistor, a second resistor, a three-pins voltage regulating tube and a third resistor; a base of the first triode is connected to the enable terminal of the master control chip and serves as an enable voltage output terminal; a collector of the first triode is connected to the external DC power supply through the first resistor, an emitter of the first triode is connected to a first pin of the three-pins voltage regulating tube through the second resistor; a second pin of the three-pins voltage regulating tube is connected to the base of the first triode; a third pin of the three-pins voltage regulating tube is grounded; one end of the third resistor is connected to the first pin of the three-pins voltage regulating tube, the other end of the third resistor is grounded.

11. The LED light string driver with music playing function of claim 10, wherein, the power supply voltage stabilizing module includes a first power supply output unit;

the first power supply output unit converts the external DC power supply into a first power supply to supply power to the power amplification module;

the first power supply output unit includes: a first diode, a second diode, a first capacitor and a second capacitor; an anode of the first diode is grounded, a cathode of the first diode is connected to the external DC power supply; an anode of the second diode is connected to the external DC power supply, a cathode of the second diode outputs the first power supply; one end of the first capacitor is connected to the external DC power supply, the other end of the first capacitor is grounded; one end of the second capacitor is connected to the first power supply, the other end is grounded.

12. The LED light string driver with music playing function of claim 11, wherein, the power amplification module includes: a power amplification chip, a ninth resistor, a tenth resistor, an eleventh resistor, a ninth capacitor and a twelfth resistor;

a power supply terminal of the power amplification chip is connected to the first power supply, a ground terminal of the power amplification chip is grounded; an enable terminal of the power amplification chip is connected to the first power supply through the ninth resistor and a power amplification enable signal output by the master control chip through the tenth resistor simultaneously;

when playing music is required, the master control chip outputs the power amplification enable signal to the enable terminal of the power amplification chip, so that the power amplification chip enters a working state;

an input terminal of the power amplification chip is connected to the music modulated signal output by the master control chip through the eleventh resistor and the ninth capacitor, a first output terminal and a second output terminal of the power amplification chip are connected to two input terminals of the speaker respectively to drive the speaker to play music;

one end of the twelfth resistor is connected to the input terminal of the power amplification chip, the other end of the twelfth resistor is connected to the first output terminal of the power amplification chip.

13. A LED light string, comprising: a light string body and the LED light string driver with music playing function of claim 1; wherein, an input terminal of the LED light string driver with music playing function is connected to an external DC power supply, an output terminal of the LED light string driver with music playing function is connected to the light string body to drive the light string body to light up.

14. A Christmas tree, comprising:

a Christmas tree body and a LED light string wrapped on the Christmas tree body;

wherein, the LED light string includes: a light string body and the LED light string driver with music playing function of claim 1; an input terminal of the LED light string driver with music playing function is connected to an external DC power supply, an output terminal of the LED light string driver with music playing function is connected to the light string body to drive the light string body to light up.

* * * * *